(12) United States Patent
Lin et al.

(10) Patent No.: US 11,338,333 B2
(45) Date of Patent: May 24, 2022

(54) LASER CLEANING SYSTEM

(71) Applicant: INSTITUTE OF SEMICONDUCTORS, CHINESE ACADEMY OF SCIENCES, Beijing (CN)

(72) Inventors: Xuechun Lin, Beijing (CN); Zhiyan Zhang, Beijing (CN); Hao Liang, Beijing (CN); Yibo Wang, Beijing (CN); Yannan Liu, Beijing (CN); Wenhao Ma, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 99 days.

(21) Appl. No.: 16/327,228

(22) PCT Filed: Aug. 18, 2017

(86) PCT No.: PCT/CN2017/098017
§ 371 (c)(1),
(2) Date: Feb. 21, 2019

(87) PCT Pub. No.: WO2018/205443
PCT Pub. Date: Nov. 15, 2018

(65) Prior Publication Data
US 2021/0138514 A1     May 13, 2021

(30) Foreign Application Priority Data

May 9, 2017 (CN) .......................... 201710323559.1

(51) Int. Cl.
*B08B 7/00* (2006.01)
*B08B 9/051* (2006.01)
(Continued)

(52) U.S. Cl.
CPC ............ *B08B 7/0042* (2013.01); *B08B 9/051* (2013.01); *B08B 13/00* (2013.01);
(Continued)

(58) Field of Classification Search
CPC ....... B08B 7/0042; B08B 9/051; B08B 13/00; B08B 2209/02; B08B 9/043; H01S 3/02;
(Continued)

(56) References Cited

U.S. PATENT DOCUMENTS 4,650,276 A * 3/1987 Lanzisera ............ G02B 6/3855
385/88
5,430,270 A * 7/1995 Findlan .............. B23K 35/0261
219/121.63
(Continued)

FOREIGN PATENT DOCUMENTS

| CN | 202155335 | 3/2012 |
| CN | 103817113 | 5/2014 |

(Continued)

OTHER PUBLICATIONS

International Search Report dated Jan. 27, 2018, issued by Chinese Patent Office, 3 pgs.

*Primary Examiner* — Xinning(Tom) Niu
(74) *Attorney, Agent, or Firm* — Christopher R. Christenson; Kelly, Holt & Christenson PLLC

(57) ABSTRACT

A laser cleaning system including a laser source, an energy-transferring optical fiber, a laser cleaning head, a coreless motor, a connection lens barrel, and a mirror.

2 Claims, 3 Drawing Sheets

(51) Int. Cl.
*B08B 13/00* (2006.01)
*B23K 26/06* (2014.01)
*H01S 3/02* (2006.01)

(52) U.S. Cl.
CPC ............ *B23K 26/0643* (2013.01); *H01S 3/02* (2013.01); *B08B 2209/02* (2013.01)

(58) Field of Classification Search
CPC ... B23K 26/0643; B23K 26/36; B23K 26/106
See application file for complete search history.

(56) References Cited

U.S. PATENT DOCUMENTS

| | | | |
|---|---|---|---|
| 2007/0193984 A1* | 8/2007 | Kawai | B23K 26/082 219/121.63 |
| 2007/0215581 A1* | 9/2007 | Kato | B28D 5/00 219/121.69 |
| 2016/0158817 A1* | 6/2016 | Zediker | C10G 75/00 134/1 |

FOREIGN PATENT DOCUMENTS

| | | |
|---|---|---|
| CN | 204353161 | 5/2015 |
| CN | 204536650 | 8/2015 |
| CN | 104971927 | 10/2015 |
| CN | 205353662 | 5/2016 |
| CN | 105750273 | 7/2016 |
| CN | 106362992 | 2/2017 |
| CN | 107185916 | 9/2017 |
| JP | 2001096390 | 4/2001 |

\* cited by examiner

LASER CLEANING SYSTEM

CROSS-REFERENCE TO RELATED APPLICATIONS

The present disclosure is a U.S. National Phase application under 35 U.S.C. § 371 of International Patent Application No. PCT/CN2017/098017, filed on Aug. 18, 2017, which claims the benefit of Chinese Patent Application No. 201710323559.1, filed on May 9, 2017 in the State Intellectual Property Office of China, the entire contents of which are incorporated herein by reference.

BACKGROUND OF THE DISCLOSURE

Field of the Disclosure

Embodiments of the present disclosure relate to the technical field of laser cleaning technology, and in particular, to a laser cleaning system configured to clean an inner wall of a pipe.

Description of the Related Art

Nowadays, laser cleaning is a cleaning technology which is efficient and green, and has advantages such as absence of any chemical reagent, absence of grinding/milling, absence of stress, absence of consumable items, and tiny or almost no injury to base material thereof, and the like, as compared with chemical cleaning and mechanical cleaning. In addition, since laser may be guided and delivered by optical fibers, then it may be utilized to clean locations which may not be easily accessible and thus has relatively wide application fields, such as rust removal, paint removal, stain removal and wafer surface processing and the like; and due to relatively high cleanliness thus caused, such a technology has been gradually applied in various fields. With a constant development of the laser cleaning in various fields, there are more and more types of samples to be cleaned thereby, and it is increasingly difficult in cleaning the samples by laser cleaning in response to different requirements in the samples to be cleaned for different clients; as such, a practically feasible cleaning system which is versatile and universal should be customized for different clients. At present, the laser cleaning technology is mostly used to clean outer surfaces of sample workpieces, and is rarely used to clean inner walls of pipes, which fact largely constrains application ranges of laser cleaning. And at present, during the laser cleaning, a dot spotted face (i.e., a bright face consists of discrete individual laser spots formed by the laser beams without focusing being directly incident on the surface to be cleaned) may be formed on a surface of a sample onto which the laser is incident, resulting in a relatively narrow cleaning range, and also tiny gaps at joints among laser spots, which may in turn cause an unsatisfactory overall cleaning effect; moreover, the cleaning way with the dot spotted face may also influence an overall cleaning efficiency at joints among laser spots.

SUMMARY OF THE DISCLOSURE

The embodiments of the present disclosure have been made to overcome or alleviate at least one aspect of the above mentioned disadvantages and/or shortcomings in the prior art, by providing a laser cleaning system.

Following technical solutions are adopted in exemplary embodiments of the invention for achieving the above desired technical purposes.

According to an aspect of the exemplary embodiment of the present disclosure, there is provided a laser cleaning system, comprising: a laser source, configured to output laser beams; an energy-transferring optical fiber, connected at an end thereof with the laser source and configured to transmit the laser beams from the laser source; laser cleaning head, which is configured to receive the laser beams transmitted through the energy-transferring optical fiber; a coreless motor which is located at a port of the laser cleaning head, and has a hollow cavity extending therethrough in an axial direction of the coreless motor, and is configured to receive and transmit the laser beams transmitted from the laser cleaning head through the cavity; a connection lens barrel, which is connected to the coreless motor and configured to receive and in turn transmit the laser beams therethrough to exit at an outlet of the connection lens barrel; and a mirror, which is located at the outlet of the connection lens barrel and configured to reflect the laser beams transmitted through the connection lens barrel onto an inner wall of a pipe to be cleaned.

According to some embodiments of the disclosure, the mirror is a tunable focusing and reflecting mirror which is configured to focus and shape the laser beams into linear laser beams.

According to some embodiments of the disclosure, an angle formed between the mirror and an axis of the connection lens barrel ranges between 90° and 180°.

In order to achieve above purposes, according to another aspect of the exemplary embodiment of the present disclosure, there is also provided a laser cleaning system configured to clean an inner wall of a pipe, comprising: a laser source, configured to output laser beams; an energy-transferring optical fiber, connected at an end thereof with the laser source and configured to transmit the laser beams from the laser source; a laser cleaning head, which is configured to receive the laser beams transmitted through the energy-transferring optical fiber; a coreless motor which is located at a port of the laser cleaning head, and has a hollow cavity extending therethrough in an axial direction of the coreless motor, and is configured to receive and transmit the laser beams transmitted from the laser cleaning head through the cavity; a connection lens barrel, which is connected to the coreless motor and configured to receive and in turn transmit the laser beams therethrough to exit at an outlet of the connection lens barrel; a tunable lens barrel which is connected with the connection lens barrel and configured to change an angle of the tunable lens barrel relative to the connection lens barrel by rotating around the connection lens barrel; and a mirror, which is located at a location where the tunable lens barrel is connected with the connection lens barrel, and is configured to reflect the laser beams transmitted through the connection lens barrel to the tunable lens barrel and in turn onto an inner wall of a pipe to be cleaned via the tunable lens barrel.

According to some embodiments of the disclosure, the laser cleaning system further comprises a focusing lens which is located at a light exit port of the tunable lens barrel and configured to focus and transmit the laser beams transmitted through the tunable lens barrel onto the inner wall of the pipe.

According to some embodiments of the disclosure, the angle of the tunable lens barrel relative to the connection lens barrel ranges between 90° and 180°.

According to some embodiments of the disclosure, the laser cleaning head is located on and drivable by a movable platform to move within the pipe.

According to some embodiments of the disclosure, the coreless motor is further configured to drive the connection lens barrel in rotation of full 360°.

According to some embodiments of the disclosure, the laser cleaning system further comprises an optical fiber locking collet disposed between the energy-transferring optical fiber and the laser cleaning head, which locks another end of the energy-transferring optical fiber and in turn connects with the laser cleaning head, and is configured to transmit the laser beams therethrough to the laser cleaning head.

According to some embodiments of the disclosure, a core diameter of the energy-transferring optical fiber ranges between 100 μm and 800 μm, for example is 400 μm.

According to some embodiments of the disclosure, an output power of the laser source ranges between 600 W and 1000 W.

According to some embodiments of the disclosure, the laser source is a pulsed laser source.

BRIEF DESCRIPTION OF THE DRAWINGS

Accompanying drawings are intended to provide a further understanding of the embodiments of the disclosure and thus form a portion of the specification, and cooperate with following specific embodiments to interpret the whole disclosure, without applying any limitation thereon. In the drawings.

DETAILED DESCRIPTION OF PREFERRED EMBODIMENTS OF THE INVENTION

Figure 1:
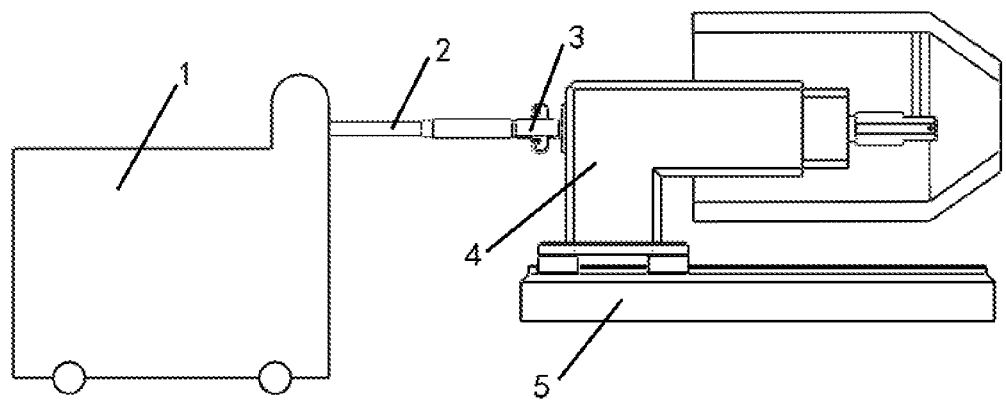
FIG. 1 illustrates a schematic structural view of a laser cleaning system according to an embodiment of the disclosure.

The above and other purposes, technical solutions and advantages of the embodiments of the present disclosure will become more apparent and a more comprehensive understanding of the present disclosure can be obtained, by describing in detail exemplary embodiments thereof hereinafter, with reference to the accompanying drawings.

Technical solution contained in embodiments of the disclosure are depicted clearly and completely with reference to the accompanying drawings hereinafter. It is apparent that the embodiments as depicted are just merely a portion of embodiments of the disclosure rather than a complete set of embodiments thereof. Based on these embodiments, all other embodiments obtained by those skilled in the art without paying any creative labor fall within a scope of protection of the disclosure In an aspect of the embodiments of the disclosure, there is provided a laser cleaning system configured to clean an inner wall of a pipe, comprising: a laser source, an energy-transferring optical fiber, a laser cleaning head, a coreless motor, a connection lens barrel and a mirror. Specifically, the laser source is configured to output laser beams; the energy-transferring optical fiber is connected at an end thereof with the laser source and configured to transmit the laser beams from the laser source to the laser cleaning head; the laser cleaning head is configured to receive the laser beams transmitted through the energy-transferring optical fiber; the coreless motor is located at a port of the laser cleaning head, and has a hollow cavity extending therethrough in an axial direction of the coreless motor and thus is configured to receive and transmit the laser beams transmitted from the laser cleaning head to the connection lens barrel; and the mirror is located at an outlet of the connection lens barrel and configured to reflect the laser beams transmitted through the connection lens barrel onto an inner wall of a pipe which is to be cleaned.

An angle is formed between the mirror and an axis of the connection lens barrel, which angle may range between 90° and 180°, so as to complete a cleaning work at a relatively large angle range.

Therefore, in an embodiment of the disclosure, the cleaning work of the inner wall of the pipe is completed by transmitting the laser beams onto the mirror through the energy-transferring optical fiber, and then changing an optical path of the laser beams with a reflection at the mirror to the inner wall of the pipe to be cleaned, and in turn bringing the optical path of the laser beams to rotate with an rotation of the motor. Such a system is simple in its structure, and may complete the cleaning work at a relatively large angle range by adjusting the angle between the mirror and the connection lens barrel depending on requirements in cleaning, thus facilitating a flexible operation/manipulation and in turn an efficient laser cleaning operation of the inner wall of the pipe.

In some embodiments of the disclosure, the mirror is for example a tunable focusing and reflecting mirror which is configured to focus and shape the laser beams into linear laser beams, such that light beams incident on the inner wall of the pipe are linear laser beams and thus form a linear spotted face (i.e., a bright face consists of a linear trace of continuous laser spots formed by the linear laser beams after focused being incident on the surface to be cleaned) rather than a dot spotted face (i.e., a bright face consists of discrete individual laser spots formed by the laser beams without focusing being directly incident on the surface to be cleaned), resulting in a relatively large cleaning range, and avoiding tiny gaps existing at joints among laser spots in a relevant cleaning way, and in turn facilitating an enhanced overall cleaning effect.

In another aspect of the embodiments of the disclosure, there is also provided a laser cleaning system configured to clean an inner wall of a pipe, comprising: a laser source, an energy-transferring optical fiber, an energy-transferring optical fiber, a coreless motor, a connection lens barrel, a tunable lens barrel, and a mirror. Specifically, the laser source is configured to output laser beams; the energy-transferring optical fiber is connected at an end thereof with the laser source and configured to transmit the laser beams from the laser source to the laser cleaning head; the laser cleaning head is configured to receive the laser beams transmitted through the energy-transferring optical fiber; the coreless motor is located at a port of the laser cleaning head, and has a hollow cavity extending therethrough in an axial direction of the coreless motor and is configured to receive and transmit the laser beams transmitted from the laser cleaning head through the cavity to the connection lens barrel; the connection lens barrel is connected to the coreless motor and configured to receive and in turn transmit the laser beams therethrough to exit at an outlet of the connection lens barrel; the tunable lens barrel is connected with the connection lens barrel and configured to change an angle of the tunable lens barrel relative to the connection lens barrel by rotating around the connection lens barrel; and the mirror is located at a location where the tunable lens barrel is connected with the connection lens barrel, and is configured to reflect the laser beams transmitted through the connection lens barrel to the tunable lens barrel and in turn onto the inner wall of the pipe, such that the laser beams are incident onto an inner wall of a pipe to be cleaned, through the tunable lens barrel.

In some embodiments of the disclosure, the laser cleaning system further comprises a focusing lens which is located at a light exit port of the tunable lens barrel and configured to focus and transmit the laser beams transmitted through the tunable lens barrel onto the inner wall of the pipe In some embodiments of the disclosure, the angle of the tunable lens barrel relative to the connection lens barrel ranges between 90° and 180°, so as to complete the cleaning work at a relatively large angle range.

In some embodiments of the disclosure, the laser cleaning head is located on and drivable by a movable platform to move within the pipe. As such, it may further enhance the flexibility of the whole system in cleaning the inner wall of the pipe.

In some embodiments of the disclosure, the coreless motor is further configured to drive the connection lens barrel in rotation of full 360°, so as to realize a cleaning of the inner wall of the pipe at full 360°. And with the coreless motor, the optical path of the laser beams may be routed through the coreless motor to the mirror.

In some embodiments of the disclosure, the laser cleaning system further comprises an optical fiber locking collet which locks another end of the energy-transferring optical fiber and in turn connects with the laser cleaning head, so as to transmit the laser beams therethrough to the laser cleaning head.

In some embodiments of the disclosure, a core diameter of the energy-transferring optical fiber for example ranges between 100 µm and 800 µm, for example is 400 µm.

In some embodiments of the disclosure, an output power of the laser source for example ranges between 600 W and 1000 W.

In some embodiments of the disclosure, the laser source is a pulsed laser source. And in some embodiments, the laser source may for example be merely a laser; or alternatively, the laser source may for example be a laser cleaner system comprising a laser, at least one optical fiber, a collimator and/or at least a mirror and the like, such that laser beams emitted by the laser are then coupled into the energy-transferring optical fiber with a relatively high coupling efficiency, so as to obtain a beneficial effect of a relatively high coupling efficiency, producing produce pulsed laser beams and in turn enhancing cleaning efficiency.

In some embodiments of the disclosure, it is provided a laser cleaning system configured to clean an inner wall of a pipe, comprising: a laser cleaner having an output power ranging between 600 W and 1000 W; an energy-transferring optical fiber whose input port is connected with the laser cleaner; an optical fiber locking collet which is configured to lock and protect another port of the energy-transferring optical fiber at one end of the collet opposite to the input port of the energy-transferring optical fiber, the optical fiber locking collet being connected at another end thereof with a laser cleaning head; a laser cleaning head, which is configured to receive the laser beams transmitted through the energy-transferring optical fiber, at a trailing end of the laser cleaning head; a movable platform which is located below the laser cleaning head and configured to move backwards and forwards; a coreless motor which is located at a leading end of the laser cleaning head; a connection lens barrel, whose one end is connected with the coreless motor and rotates while another end is connected with a tunable lens barrel whose angle is tunable; a mirror which is located between the connection lens barrel and the tunable lens barrel whose angle is tunable; and a focusing lens which is located at a light exit end port of the tunable lens barrel whose angle is tunable. And the energy-transferring optical fiber has a core diameter of 400 µm, and an angle is formed between the tunable lens barrel whose angle is tunable and the connection lens barrel, with a value thereof ranging between 90° and 180°.

The laser cleaning system is depicted in detail by specific embodiments set forth hereinafter.

Figure 2:
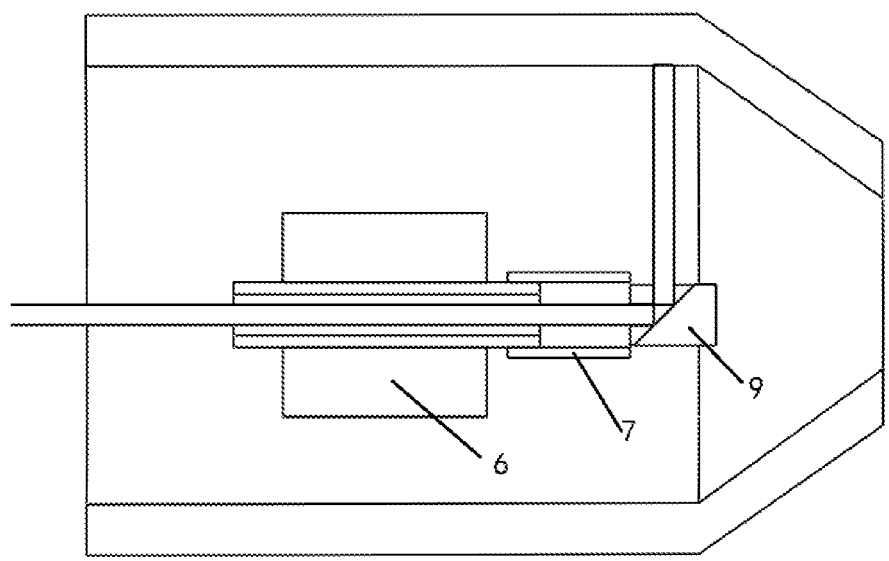
FIG. 2 illustrates a schematic partial structural view of the laser cleaning system as illustrated in FIG. 1.
Figure 3:
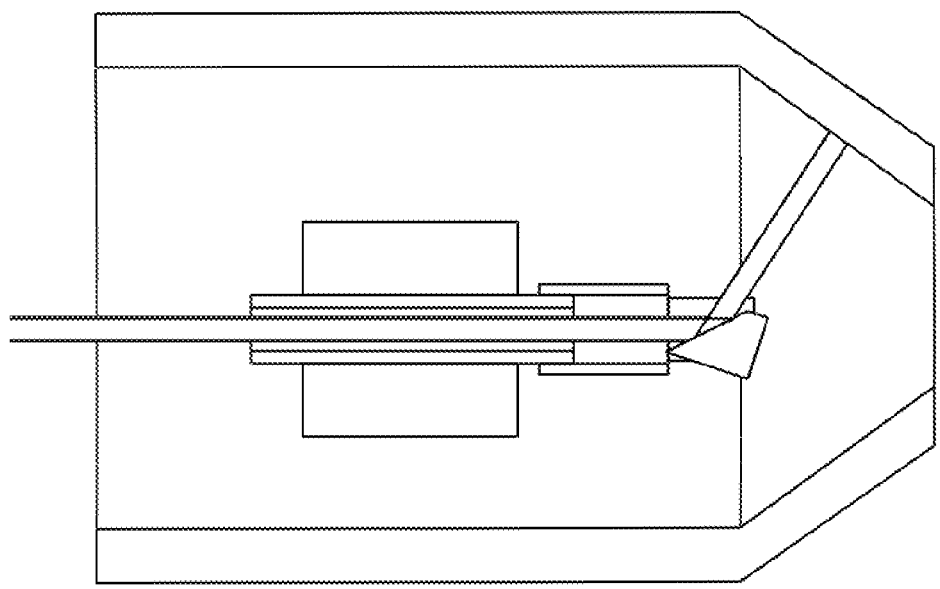
FIG. 3 illustrates another schematic partial structural view of the laser cleaning system as illustrated in FIG. 1.

According to one specific embodiment of the disclosure, according to a general technical concept of the present disclosure, with reference to FIGS. 1-3, a laser cleaning system configured to clean an inner wall of a pipe is provided, comprising:

a high power laser cleaner 1 having an output power of 800 W;

an energy-transferring optical fiber 2 whose input port is connected with the high power laser cleaner 1 and has a core diameter ranging between 100 µm and 800 µm;

an optical fiber locking collet 3 which is configured to lock and protect another port of the energy-transferring optical fiber 2 at one end of the collet 3 opposite to the input port of the energy-transferring optical fiber 2, the optical fiber locking collet 3 being connected at another end thereof with a laser cleaning head 4;

a laser cleaning head 4, which is located on a movable platform 5 and configured to move back and forth within the pipe, with a motion of the movable platform 5, and also to receive the laser beams transmitted through the energy-transferring optical fiber, at a trailing end of the laser cleaning head;

a coreless motor 6 which is located at a leading end of the laser cleaning head 4;

a connection lens barrel 7, whose one end is connected with the coreless motor 6 and thus may be driven by the coreless motor 6 to rotate at full 360°;

a mirror 9 which is connected with another end of the connection lens barrel 7, with an angle formed between the mirror and an axis of the connection lens barrel 7 being tunable and ranging between 90° and 180°, and said mirror being a tunable focusing and reflecting mirror.

An operating principle of the laser cleaning system of the embodiment lies in that: above all, the high-power laser cleaner 1 is modulated by a solid-state laser to produce a pulsed laser which is then coupled and in turn enters the energy-transferring optical fiber 2, and is then transmitted through the optical fiber locking collet 3 to the laser cleaning head 4 which is connected with the movable platform 5 and thus is movable back and forth; said pulsed laser in turn passes through the coreless motor 5, and is transmitted sequentially through the connection lens barrel 7 connected with the coreless motor and then to the mirror 9 and subsequently incident onto the inner wall of the pipe so as to complete a cleaning of the inner wall of the pipe. By driving the connection lens barrel to rotate with the coreless motor 6, a cleaning of the inner wall of the pipe at full 360° may be implemented.

The laser cleaning head 4 of the embodiment may implement not only a cleaning of the inner wall of the pipe at an right angle, but also a cleaning at an even larger angle, so as to realize a seamless cleaning inside the pipe, i.e., there will be no blind/dead corner during the cleaning. As illustrated in FIG. 3, said another end of the connection lens barrel 7 is connected with the mirror 9, with the angle formed between the mirror 9 and the connection lens barrel 7 ranging between 90° and 180°, so as to implement the cleaning at an even larger angle to meet a requirement of cleaning without any blind/dead corner, i.e., a seamless cleaning.

Figure 4:
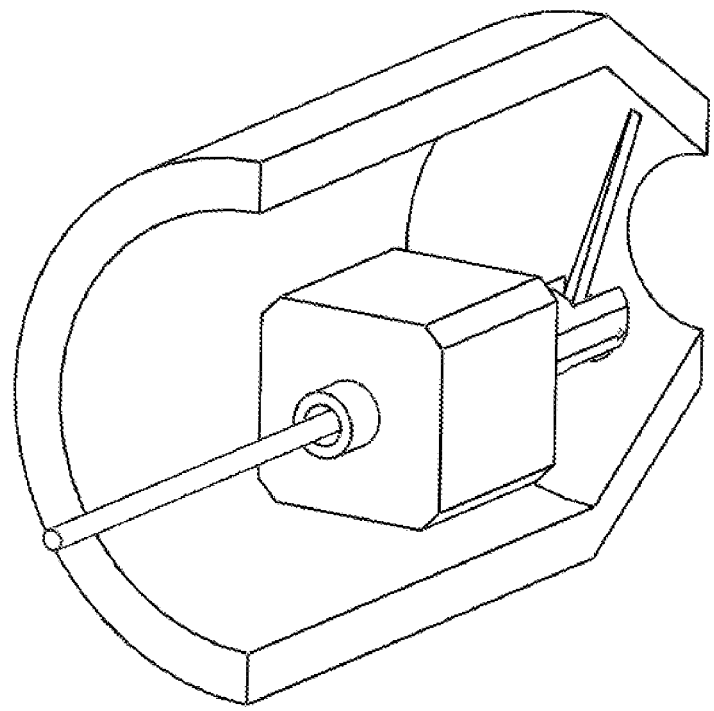
FIG. 4 illustrates a schematic partial cross-sectional view of a laser cleaning system according to an embodiment of the disclosure, upon cleaning of an inner wall of a pipe.

The mirror in the embodiment of the disclosure may be a tunable focusing and reflecting mirror, then, as illustrated in FIG. 4, it may focus laser beams reflected thereon by a single face which is also the same as the reflecting surface, and thus the laser beams reflected by the tunable focusing and reflecting mirror is shaped in a form of linear laser beams.

In conclusion, in the laser cleaning system configured to clean the inner wall of the pipe according to the embodiment of the disclosure, as far as a main improvement thereof is concerned, its laser cleaning head is redesigned such that a new transmission optical path of laser beams is introduced, which changes previous direct output mode of a straight optical path, such that the laser beams may be transmitted through the motor to the tunable focusing and reflecting mirror and be reflected there, and in turn be incident on a target surface of the item to be cleaned; meanwhile, the angle of the mirror may be adjusted at will/randomly so as to implement a cleaning at a relatively large angle, facilitating a more flexible and convenient laser cleaning. In addition, by using the tunable focusing and reflecting mirror, the laser beams may be reflected and also be shaped by focusing, simultaneously, such that the laser beams exiting the tunable focusing and reflecting mirror are shaped into high-power linear beams, i.e., laser beams incident onto the inner wall of the pipe are linear laser beams so as to continuously scan the inner wall of the pipe and thus to form a linear spotted face (i.e., a bright face consists of a linear trace by the linear laser beams being incident on the surface to be cleaned) instead of the dot spotted face, resulting in a relatively large cleaning range, and avoiding tiny gaps existing at joints among laser spots in a relevant cleaning way, and in turn facilitating an enhanced overall cleaning effect.

Figure 5:
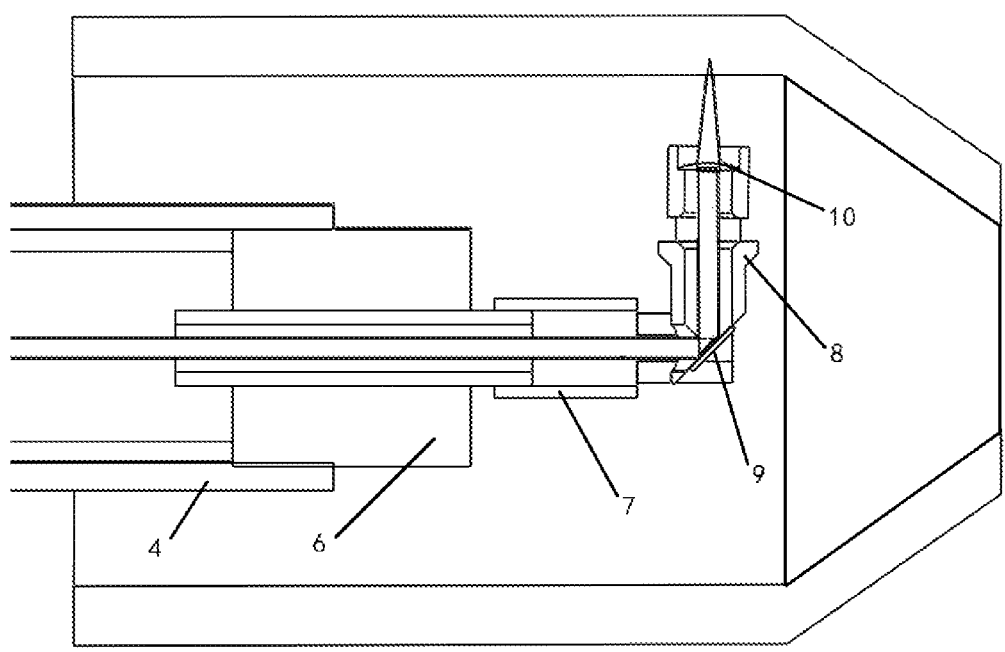
FIG. 5 illustrates a schematic structural view of a laser cleaning system according to another embodiment of the disclosure.

According to another specific embodiment of the disclosure, with reference to FIG. 5, a laser cleaning system configured to clean an inner wall of a pipe is provided, which is similar to that as set forth in the above embodiment, merely differing in that: in this laser cleaning system according to another specific embodiment, the mirror 9 is a high reflective mirror at 45°, and a tunable lens barrel 8 is additionally provided, with a focusing lens 10 being provided at a light exit end port of the tunable lens barrel 8; as such, the pulsed laser reflected by the mirror 9 may pass through the tunable lens barrel 8 and in turn be focused by the focusing lens 10 to the inner wall of the pipe, so as to complete a cleaning work of the inner wall of the pipe.

There are several advantageous technical effects brought about by the technical solutions with the laser cleaning system as provided in embodiments of the disclosure, as below:

1. In embodiments of the disclosure, laser beams are transmitted by an energy-transferring optical fiber to a mirror, and then an optical path thereof is changed by a reflection of the mirror so as to be reflected onto an inner wall of the pipe which is to be cleaned, and a coreless motor in turn rotates to drive the optical path of the reflected laser beams in rotation so as to complete a task of cleaning the inner wall of the pipe. Such a system has a relatively simple structure, and may complete a cleaning task at a relatively large angle by adjusting an angle between the mirror (or a tunable leans barrel) and a connection lens barrel depending on requirements in cleaning, facilitating a flexible operation/manipulation and in turn an efficient laser cleaning operation of the inner wall of the pipe.

2. In embodiments of the disclosure, a laser cleaning head is located on a movable platform such that it may moves inside the pipe, which fact further enhances flexibility of the whole system in cleaning the inner wall of the pipe.

3. In embodiments of the disclosure, the mirror may be a tunable focusing and reflecting mirror which is configured to focus and shape the laser beams into linear laser beams having a relatively high power, such that light rays incident on the inner wall of the pipe are linear light rays and thus form a linear spotted face (i.e., a bright face consists of a linear trace formed by the linear laser beams being incident on the surface to be cleaned) instead of the dot spotted face, resulting in a relatively large cleaning range, and avoiding tiny gaps existing at joints among laser spots in a relevant cleaning way, and in turn facilitating an enhanced overall cleaning effect.

It should be appreciated for those skilled in this art that the above embodiments are merely preferred embodiments intending to be illustrative, and not restrictive. Furthermore, for example, features as set forth herein may be applicable to various embodiments unless stated otherwise; and many modifications may be made to the above embodiments by those skilled in this art, and various features described in different embodiments may be freely combined with each other or one another without conflicting in configuration or principle.

And it should be noticed that, above definitions of various components are not merely limited to specific structures or shapes as set forth above in the embodiments, and purposes, technical solutions and beneficial effects are further depicted in detail in above specific embodiments; and it would be appreciated by those skilled in the art that various changes, substitutions or modifications may be made in these embodiments without departing from the principles and spirit of the disclosure and lie within the scope of present application, which scope is defined in the claims and their equivalents.

What is claimed is:

1. A laser cleaning system, comprising:
   a laser source configured to output laser beams;
   an energy-transferring optical fiber connected at an end thereof with the laser source and configured to transmit the laser beams from the laser source;
   a laser cleaning head configured to receive the laser beams transmitted through the energy-transferring optical fiber;
   a coreless motor that is located at a port of the laser cleaning head, has a hollow cavity extending therethrough in an axial direction of the coreless motor, and is configured to receive and transmit the laser beams transmitted from the laser cleaning head through the cavity;
   a connection lens barrel, wherein one end of the connection lens barrel is connected to the coreless motor and the connection lens barrel is configured to receive and in turn transmit the laser beams therethrough to exit at an outlet of the connection lens barrel;
   a mirror that is located at the outlet of the connection lens barrel, is connected to the other end of the connection lens barrel and is configured to reflect the laser beams transmitted through the connection lens barrel onto an inner wall of a pipe to be cleaned; and an optical fiber locking collet disposed between the energy-transferring optical fiber and the laser cleaning head, wherein the optical fiber locking collet locks another end of the energy-transferring optical fiber and in turn connects with the laser cleaning head, and wherein the optical fiber locking collet is configured to transmit the laser beams therethrough to the laser cleaning head, wherein an angle formed between the mirror and an axis of the connection lens barrel ranges between 90° and 180°, wherein the mirror is a tunable focusing and reflecting mirror that is configured to reflect the laser beams and focus the laser beams in a single dimension, so as to form linear laser beams having a linear spot, wherein the laser cleaning head is located on and is drivable by a movable platform located outside the pipe to move within the pipe, wherein a core diameter of the energy-transferring optical fiber ranges between 100 μm and 800 μm, wherein an output power of the laser source ranges between 600 W and 1000 W, wherein the coreless motor is further configured to drive the connection lens barrel in rotation of full 360°, so that the mirror connected to the connection lens barrel rotates with the rotation of the connection lens barrel, while the angle formed between the mirror and the axis of the connection lens barrel ranges between 90° and 180°, and wherein the laser source is a laser cleaner, the laser cleaner is modulated by a solid-state laser to produce a pulsed laser, the pulsed laser is coupled to and in turn enters the energy-transferring optical fiber, and is then transmitted through the optical fiber locking collet to the laser cleaning head which is connected with the movable platform and is movable back and forth, and the pulsed laser in turn passes through the coreless motor and the connection lens barrel connected with the coreless motor to the mirror in order to incident onto the inner wall of the pipe.

2. A laser cleaning system, comprising:

a laser source configured to output laser beams;

an energy-transferring optical fiber connected at an end thereof with the laser source and configured to transmit the laser beams from the laser source;

a laser cleaning head configured to receive the laser beams transmitted through the energy-transferring optical fiber;

a coreless motor that is located at a port of the laser cleaning head, has a hollow cavity extending therethrough in an axial direction of the coreless motor, and is configured to receive and transmit the laser beams transmitted from the laser cleaning head through the cavity;

a connection lens barrel, wherein one end of the connection lens barrel is connected to the coreless motor, and the connection lens barrel is configured to receive and in turn transmit the laser beams therethrough to exit at an outlet of the connection lens barrel;

a tunable lens barrel that is connected with the connection lens barrel and is configured to change an angle of the tunable lens barrel relative to the connection lens barrel by rotating around the connection lens barrel;

a mirror that is located at a location where the tunable lens barrel is connected with the connection lens barrel, is connected to the other end of the connection lens barrel and is configured to reflect the laser beams transmitted through the connection lens barrel to the tunable lens barrel and in turn onto an inner wall of a pipe to be cleaned via the tunable lens barrel;

a focusing lens that is located at a light exit port of the tunable lens barrel and is configured to focus and transmit the laser beams transmitted through the tunable lens barrel onto the inner wall of the pipe; and an optical fiber locking collet disposed between the energy-transferring optical fiber and the laser cleaning head, wherein the optical fiber locking collet locks another end of the energy-transferring optical fiber and in turn connects with the laser cleaning head, and wherein the optical fiber locking collet is configured to transmit the laser beams therethrough to the laser cleaning head, wherein an angle formed between the mirror and an axis of the connection lens barrel ranges between 90° and 180°, wherein the coreless motor is further configured to drive the connection lens barrel in rotation of full 360°, so that the mirror connected to the connection lens barrel rotates with the rotation of the connection lens barrel, while the angle formed between the mirror and the axis of the connection lens barrel ranges between 90° and 180°, wherein the mirror is a tunable focusing and reflecting mirror that is configured to reflect the laser beams and focus the laser beams in a single dimension, so as to form linear laser beams having a linear spot, wherein the angle of the tunable lens barrel relative to the connection lens barrel ranges between 90° and 180°, wherein the laser cleaning head is located on and is drivable by a movable platform located outside the pipe to move within the pipe, wherein a core diameter of the energy-transferring optical fiber ranges between 100 μm and 800 μm, wherein an output power of the laser source ranges between 600 W and 1000 W, and wherein the laser source is a laser cleaner, the laser cleaner is modulated by a solid-state laser to produce a pulsed laser, the pulsed laser is coupled to and in turn enters the energy-transferring optical fiber, and is then transmitted through the optical fiber locking collet to the laser cleaning head which is connected with the moveable platform and is moveable back and forth, and the pulsed laser in turn passes through the coreless motor and the connection lens barrel connected with the coreless motor to the mirror, and passes through the tunable lens barrel and the focusing lens to incident onto the inner wall of the pipe.

* * * * *